United States Patent Office 3,258,313
Patented June 28, 1966

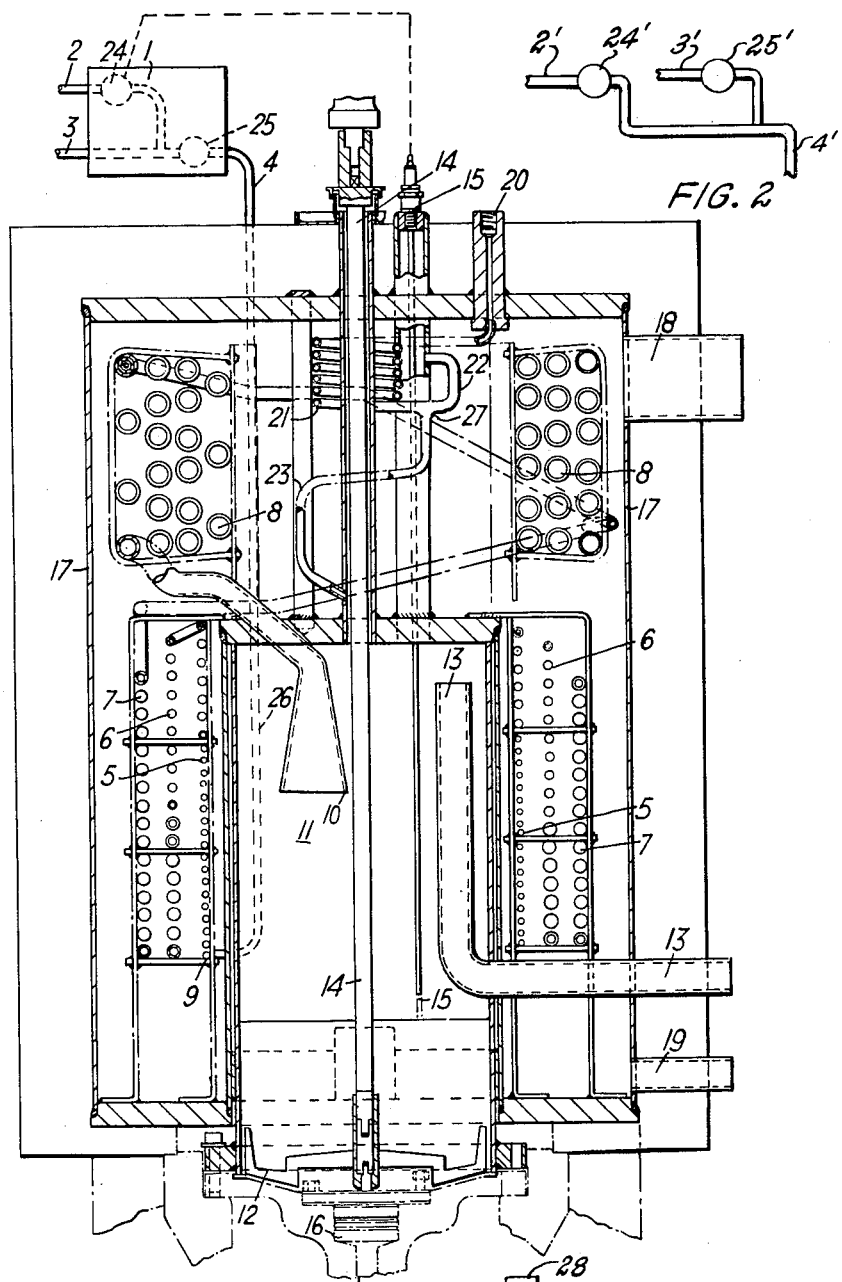

3,258,313
POLYMERISATION APPARATUS
Gwilym David Griffiths, Malpas, Newport, England, assignor to British Nylon Spinners Limited, Pontypool, England
Filed Mar. 25, 1963, Ser. No. 267,726
Claims priority, application Great Britain, Apr. 5, 1962, 13,070/62
5 Claims. (Cl. 23—290)

The present invention relates to apparatus for the manufacture of high molecular weight polymers and more particularly to apparatus for making high molecular weight linear polyamides by the continuous condensation polymerisation of monomers which are polymethylene diammonium salts of dibasic aliphatic acids or which are omega-amino aliphatic carboxylic acids.

The expression "high molecular weight linear polyamides" is intended to signify that the degree of polymerisation of the polyamides is sufficiently great for them to be capable of being melt-spun into filaments. This degree of polymerisation is reached when at least about 90–95% of the theoretical total water of chemical condensation, i.e. of the maximum water theoretically available, has been eliminated by the condensation reaction.

As compared with a batch process or discontinuous process for polymerising the above-mentioned monomer salts or amino acids, for example, hexamethylene diammonium adipate, a continuous process offers a number of advantages, both economic and technical, for instance, the production of a polyamide of uniform high quality. Numerous attempts have accordingly been made to design apparatus for this purpose.

It has now been found, rather unexpectedly, that the condensation polymerisation in question can be successfully accomplished in one stage by means of a compact apparatus comprising a long narrow tube surrounding to a greater or less extent and leading into a vessel, the tube and vessel being enclosed in a tank containing fluid maintained at polymerisation temperatures, i.e. temperatures at which polymerisation occurs. In operating the apparatus the monomer is introduced into the entry end of the narrow tube by a first pumping means and the polymer issuing from the exit end thereof collects in the vessel, whence it is delivered as required by a second pumping means.

By the phrase "narrow tube" is to be understood a tube having, at least for the greater part of its length (starting from the entry end) an internal diameter not exceeding 2.5 cm. A suitable diameter is 1.2 cm. The diameter of the tube need not be uniform; it can increase from the inlet towards the outlet. Moreover the tube may possess any convenient shape adapted to be accommodated by the aforesaid tank and surround the said vessel e.g. one or more spirals or helices with vertical axes, which may be traversed by the polymerising material in an upward or downward direction. The material of which the tube is constructed is conveniently one not subject to corrosion by the polymerising material and may be, for instance, stainless steel. The tube must be capable of withstanding a high pressure which may ,for example reach 28 atmospheres at the entry end. The exit end of the aforesaid narrow tube may be positioned in the wall of the said vessel so that the tube ends flush therewith or else the tube may be prolonged within the vessel. The exit end of the narrow tube may optionally be modified by attaching thereto various sorts of outlet devices, especially devices designed to facilitate the separation of the issuing molten polyamide and the steam which accompanies it. An example thereof would be a cyclone separator (see Chemical Engineers Handbook, J. H. Perry, McGraw-Hill Publishing Company Ltd. 3rd edition, 1953, page 1023). The vessel into which the narrow tube leads, and in which the molten polymer collects is usually under atmospheric pressure. The molten polymer can be melt-spun into filaments from the aforesaid vessel by pumping it through a suitable spinneret.

The present invention consists accordingly of an apparatus for the continuous condensation polymerisation of polyamide-forming monomers which are omega-amino aliphatic carboxylic acids or polymethylene diammonium salts of dibasic aliphatic acids, comprising a long narrow tube (as hereinbefore defined) whereof the entry end is furnished with a first pumping means for introducing the monomer and the exit end optionally with an outlet device, a vessel, into which the exit end of said tube leads, serving as a reservoir for the polyamide issuing from the said exit end and furnished with a second pumping means for delivering the polyamide therefrom and with vapour release means, said long narrow tube being bent into a compact configuration and surrounding to a greater or less extent the aforesaid vessel, and jacketing means filled with fluid at polymerisation temperatures substantially surrounding both the tube and the vessel.

The invention will be further understood from the following detailed description taken with the drawing in which:

FIGURE 1 is an elevational sectional view of a polymerisation apparatus including pumping means for supplying monomer solution thereto; and FIGURE 2 is a fragmentary view illustrating a second form of pumping means for use with the apparatus of FIGURE 1.

The polyamide produced by the present apparatus may be withdrawn as a molten stream but it is frequently found desirable to melt-spin the polyamide issuing from the apparatus through a spinneret (with its usual accompanying filter) into filaments because the necessity to remelt the polyamide is thus avoided and it is also possible to minimise the time during which the polyamide is maintained in a molten condition and so lessen the tendency for degradation to occur. The invention includes the above apparatus wherein the second pumping means is attached to a conventional spinneret for melt-spinning filaments, films, ribbons and like shaped objects.

If desired the vessel serving as a reservoir for the polyamide may be fitted with a level detecting device, which automatically operates the first pumping means by suitable conventional electronic circuits so as to maintain the molten polyamide in the reservoir at a substantially constant level despite variation in the delivery of polyamide therefrom. For melt-spinning operations cannot be conducted indefinitely because, sooner or later, the spinneret with its accompanying filter has to be detached for cleaning. Whilst the fresh spinneret is being fitted either the molten polyamide issuing from the apparatus must be allowed to form waste polymer, or the outflow must be stopped. It needs hardly pointing out that the former alternative is uneconomic and the latter would cause the level of molten polyamide in the reservoir which precedes the spinneret to rise. But it is to be noted that one cannot advisedly alter or adjust the rate of production of polymer merely by altering the rate of introduction of the monomer solution since the conditions of polymerisation and therefore the properties of the resulting polymer are thereby undesirably affected. In other words the desired steady conditions of polymerisation no longer obtain. However it is possible to vary the rate of introduction of the monomer itself by introducing a plurality of aqueous solutions of the monomer of different concentrations and varying the proportions in which said solutions are introduced, without any important effect on the said conditions, providing the total volume of solution introduced in a given unit of time is kept constant or very nearly so. For example, two different aqueous solutions of monomer differing in percentage concentration (calculated on the solution) by 10 to 20 may be employed; or else a strong solution together with water (regardable as a solution of zero concentration) may be chosen. The use of the word solution in this connection is accordingly intended to include water and aqueous solutions devoid of monomer. In this way the rate of production of polyamide, i.e. the rate at which it issues from the polymerisation apparatus, can be adjusted or regulated without affecting the conditions of polymerisation so as to spoil the quality of the polyamide.

The plurality of aqueous solutions of the monomer may consist of two solutions of different concentrations differing by, for example, from 5 to 50% (calculated on the solution). Indeed, as already indicated, one of the solutions may be of zero concentration, i.e. devoid of monomer, and will in this case, in the absence of any other solute, constitute water. At room temperature (17° C.) 47% of hexamethylene diammonium adipate salt dissolves in water, and this solution can be employed in the present process together with for instance a 43% solution of the said salt or together with water. If stronger solutions of the monomer are desired, the solution can be heated. In the case of hexamethylene diammonium adiphate salt, for example at 111° C., 70 parts by weight of the salt are soluble in 30 parts by weight of water, so as to constitute a solution containing 70% by weight of salt. Clearly the stronger the solutions of monomer, the less water has to be evaporated during the polymerisation.

The first pumping means used for introducing the aforesaid plurality of monomer solutions into the polymerisation apparatus may comprise numerous piping arrangements and a given piping arrangement may often be operated in many different ways. Two simple arrangements will be described below by way of illustration, and for convenience they will be referred to as Piping Arrangement A and Piping Arrangement B.

*Piping Arrangement "A"*

Each solution of the plurality of aqueous solutions of monomer is forwarded by a separate pump into a common pipe line leading to the polymerisation apparatus.

If, for simplicity, the case of two solutions of monomer of different concentrations be considered, say 40% and 45%, then the rate of production of polyamide may be regulated by simultaneously varying in a continuous or discontinuous manner the rate of output of each pump, by increasing the rate of one whilst decreasing that of the other, so that the total volume of solution passed by both pumps in a given unit of time, remains constant. The variation in the rate of output may be executed slowly or rapidly or practically instantaneously, as may be desired. In fact, one simple mode of operation is to run the pumps alternatively, that is to introduce into the polymerisation apparatus at any given instant either the one monomer solution or the other.

*Piping Arrangement "B"*

In this arrangement a first monomer solution is forwarded by a first pump into the pipe line leading from the supply reservoir of the second monomer solution, the combined first and second monomer solutions are forwarded by a second pump into the pipe line leading from the supply reservoir of the third monomer solution, and so forth. In this case the output of each pump exceeds that of the preceding pump and the output of the last pump is constant.

Thus when only two monomer solutions are used there are only two pumps and the rate of production of polyamide is regulated by varying the rate of output of the first pump, i.e. the pump forwarding the first monomer solution into the pipe line leading from the supply reservoir of the second monomer solution, the combined solutions being forwarded to the polymerisation apparatus by the second pump which runs at a constant rate of output.

The variation of the rate of output of the first pump may be carried out in various ways, as already explained in connection with Piping Arrangement A, except that in Arrangement A it is necessary to adjust two pumps when two monomer solutions are used. Thus the rate of production of polyamide may be regulated by running the first pump at one of two given rates of output, the appropriate rate being selected by conventional electronic means governed for example, by the level detecting device situated in the reservoir, already referred to, which contains the molten polyamide about to be melt-spun. The electronic means may be designed so that the change from one rate of output to the other is not sudden or abrupt, but takes a longer or shorter time, as desired.

It is important to remark that in the case where two monomer solutions are employed and one of them is of zero concentration, i.e. constitutes water or an aqueous solution devoid of monomer, care must be taken to ensure that the supply of monomer to the polymerisation apparatus from the other solution in never wholly interrupted during the polymerisation process.

Examples of suitable polymethylene diammonium salts and omega-amino acids for use as monomers in the present apparatus are the following:

Hexamethylene diammonium adipate
Hexamethylene diammonium sebacate
Octamethylene diammonium adipate
Decamethylene diammonium adipate
Pentamethylene diammonium sebacate
Dodecamethylene diammonium adipate
Omega-amino-caproic acid
Omega-amino-undecanoic acid Mixtures of monomers may optionally be employed e.g. a mixture of hexamethylene diammonium adipate and hexamethylene diammonium sebacate, in which case interpolyamides are produced.

Moreover there may be included in the reaction mixture monofunctional compounds in small quantity, notably monoamines or monobasic acids, e.g. acetic acid, in order to prevent polymerisation proceeding beyond the desired degree at elevated temperatures, for example, when the polyamide is held molten for the purpose of melt-spinning. Such monofunctional compounds are known as viscosity stabilisers. Other adjuvants may also be added at any convenient stage of the process, for instance, dyes, pigments, dyestuff formers, heat stabilisers, light stablisers, plasticisers, delustrants, polyamide and other resins.

For making a given polyamide it is found in practice that a temperature at least 10° C. above the melting point of the polyamide can be regarded as a suitable polymerisation temperature i.e. a temperature at which amide-formation proceeds at a useful rate, provided it be not too high otherwise degradation of the polyamide is likely to occur. The temperature in the case of polyhexamethylene adipamide is advantageously from 285° C. to 290° C. The pressure at the entry end of the tube is preferably between 28 and 34 atmospheres. All pressures quoted are absolute.

In using the present apparatus it is preferable to carry out the polymerisation by pumping the aqueous solution or solutions of the monomer through the long narrow tube heated to polymerisation temperatures, the pressure being at least 14 atmospheres at the entry end of said tube, and continuously decreasing along the tube and until it reaches substantially atmospheric or sub-atmospheric pressure at the exit thereof but always permitting the evolution of steam. The latter is derived from the aqueous solution of the monomer and from the water eliminated by chemical condensation. The pressure at any point in the tube has a value which is a continuous monotonic single-value function of the distance of said point along the tube. The rate of passage of the polymerising material through the tube is such that at least 90% of the total theoretical water of chemical condensation is evolved during said passage.

The present apparatus may be made of any convenient material but the long narrow tube and the vessel, since they come in contact with the molten polyamide are preferably made of stainless steel which is resistant to corrosion. Other parts of the apparatus may be made of mild steel.

The invention is illustrated but not limited by FIGURE 1. The significance of the numerals in the drawing is given below:

1. First pumping means
2,3. Inlets thereof
4. Outlet thereof (monomer supply pipe)
5,6,7,8. Long narrow tube
9. Entry end thereof
10. Exit end thereof
11. Vessel
12. Stirrer therefor
13. Vapour release means of vessel
14. Driving shaft
15. Level detecting device
16. Second pumping means
17. Jacketing means
18. Inlet pipe thereof
19. Outlet pipe thereof
20. Inert gas supply pipe
21. Coil for heating inert gas
22. Pipe supplying inert gas to level detecting devices
23. Pipe supplying inert gas to driving shaft
24. First pump of Piping Arrangement B
25. Second pump of Piping Arrangement B
26. Supply pipe to long narrow tube
27. Pipe junction for inert gas supply
28. Spinneret In operating the apparatus two aqueous monomer solutions of different concentrations may be supplied through inlets 2 and 3. In the present example, however, only one of the solutions (referred to below in Solution No. 1) contains monomer, the concentration thereof in the other solution (referred to below as Solution No. 2) being zero. The two solutions which enter pumping means 1 by inlets 2 and 3 respectively are combined in controlled proportions by Piping Arrangement B (already described above) which pumping means 1 comprises. Thus the monomer solution (solution No. 1) from inlet 2 is forwarded by the first pump 24 of Piping Arrangement B into the pipe line from inlet 3 and containing Solution No. 2. The combined solutions are then forwarded by the second pump 25 of Piping Arrangement B to the supply pipe 26 leading to the entry end 9 of the long narrow tube 5, 6, 7, 8, which is wholly fabricated of austenitic steel. The latter is in four sections of increasing internal diameter numbered accordingly, thus:

| | Internal Diameter | Length |
|---|---|---|
| Section 5 | 5 millimetres | 18 metres. |
| Section 6 | 7 millimetres | 18 metres. |
| Section 7 | 1 centimetre | 30 metres. |
| Section 8 | 2.1 centimetres (flared at the outlet end to 6 centimetres). | 22.5 metres. |

The polymerising material proceeds through the aforesaid long narrow tube 5, 6, 7, 8 all of which is maintained at polymerisation temperatures by the hot surrounding fluid contained in the jacketing means 17. The resulting polyamide issues from the tube at its flared exit end 10 which is within the vessel 11 and collects in a pool which is agitated by the stirrer 12 driven by the driving shaft 14. The vessel 11 is likewise maintained at polymerisation temperatures by the hot surrounding fluid contained in the jacketing means 17. The steam and other vapours or gasses liberated during the course of the polymerisation escape by way of the vapour release means 13. The hot fluid for the jacketing means 17 is constantly supplied through the inlet pipe 18 and removed (somewhat cooled and in the case of a vapour perhaps partially condensed) through the outlet pipe 19.

The molten polyamide is delivered from vessel 11, by the second pumping means 16 to a conventional filter and spinneret 28 through which the polyamide is melt-spun into filaments. The pumping means 16 is driven by a prolongation of shaft 14.

The rate of production of polyamide is regulated by running the first pump 24 at one of two given rates of output, whilst the rate of output of pump 25 is maintained at a constant value. In this way the level of molten polyamide in vessel 11 is kept substantially constant. This is effected automatically by the level detecting device 15 which, by conventional electronic means, selects the appropriate rate of output for pump 24. Thus when the level of molten polyamide rises so as to touch the electrical conductor of the level detecting device 15 an electric circuit is completed which causes the pump 24 to operate at the lower of its two speeds. As soon as the level of molten polyamide sinks and breaks the aforesaid circuit the higher speed of operation for pump 24 is selected.

An inert gas stream, e.g. nitrogen, is introduced through the supply pipe 20, heated in the coil 21 (which like the coil 5, 6, 7, 8 is surrounded by hot fluid contained in the jacketing means 17) and caused to sweep through the level detecting device 15 to prevent it becoming encrusted with adventitious sublimates. For a similar reason, part of the aforesaid gas stream is directed, via the pipe junction 27, to the driving shaft 14.

Specific illustrative conditions of operation of the above apparatus are as follows:

Hot fluid in jacketing means 17 -- Vapour from eutectic mixture of diphenyl and diphenyl oxide.
Temperature thereof ---------- 293° C.
Monomer employed ---------- Hexamethylene diammonium adipate salt.
Solution No. 1 (the percentages are by weight) ------------- 47.0% hexamethylene diammonium adipate salt.
0.45% hexamethylene diamine.
0.1% glacial acetic acid.
52.45% water.
Solution No. 2 --------------- 0.45% hexamethylene diamine.
99.55% water.
Inert gas for inlet 20 --------- Nitrogen.
Rate of output of pump 24 ----- Higher 140 cc. per minute.
Lower 120 cc. per minute.
Rate of output of pump 25 ----- 140 cc. per minute.
Pressure at entry end of tube 9 -- 24½ atmospheres.
Pressure at exit end of tube 10 and in vessel 11 ------------ Atmospheric.
Rate of output of pumping means 16 (i.e. delivery rate of resulting polyamide) ----- 61.2 gms. per minute.
Relative viscosity of polyamide _ 34.3.
Amine ends of polyamide (expressed in gram equivalent per million grams of polyamide) -------------------- 44.9.

The relative viscosity of a polyamide is defined as the ratio of the viscosity of an 8.4% (solute:solution) solution thereof in 90% (solute:solution) aqueous formic acid to the viscosity of the said aqueous formic acid at the same temperatures.

FIGURE 2 illustrates Piping Arrangement "A" wherein the outlet of each pump 24' and 25' connects separately with the main supply pipe 4'. The inlet pipes for the pumps 24' and 25' are illustrated at 2' and 3', respectively.

What we claim is:
1. An apparatus for the continuous condensation polymerization of polyamide-forming monomers which are selected from the group consisting of omega-amino aliphatic carboxylic acids and polymethylene diammonium salts of dibasic aliphatic acids, comprising: a vessel for holding polyamide;
 single stage reaction means for receiving a stream of monomer-containing material and polymerizing the monomer continuously along a single path and for continuously releasing steam along said path under continuously decreasing pressure, said means being a single long narrow tube which is bent into a compact configuration and which substantially surrounds said vessel, said tube having an outlet end communicating with said vessel and an inlet end, said tube further having an internal diameter not exceeding 2.5 cm. for the greater part of its length beginning at said inlet end;
 pressure release means associated with said vessel for releasing steam therefrom;
 pump means associated with said vessel for delivering polyamide therefrom;
 jacketing means substantially surrounding both said tube and said vessel for receiving fluid at polymerization temperatures;
 pump and flow control means associated with said inlet end of said tube for introducing monomer at a controlled rate and for simultaneously introducing a substantially constant volume of monomer-containing material per unit of time whereby the rate of polyamide production can be varied without varying the properties of the polyamide formed in said tube, said means including a main supply pipe in communication with the said inlet end of said tube, a plurality of pumps each having a separate inlet and outlet, said outlets being in communication with said main supply pipe and each of said inlets being connected to separate supply conduit, a liquid level detecting device associated with said vessel, and electronic circuit means associated with said level detecting device and with at least one of said pumps for automatically maintaining a substantially constant level of polyamide in said vessel whereby the monomer concentration in said tube may be varied while maintaining constant volume flow rate in said tube by supplying material of different monomer concentrations to said separate supply conduits.

2. Apparatus as in claim 1 including a separate discharge conduit associated with the outlet of each of the plurality of pumps, each of said separate discharge conduits being in direct communication with said main supply pipe.

3. Apparatus as in claim 1 wherein said plurality of pumps have different capacities, the outlet of the highest capacity pump being in direct communication with said main supply pipe and the outlets of the other pumps being in communication with the supply conduit which leads to the pump of next higher capacity.

4. Apparatus as in claim 1 wherein said vessel, said tube, the pump means for delivering polyamide from said vessel and the plurality of pumps for supplying monomer-containing material to said tube are constructed of stainless steel.

5. In an apparatus for the continuous condensation polymerization of a polyamide-forming monomer-containing stream which includes a source of unpolymerized monomer-containing material, polymerization means, a vessel for receiving polyamide from said polymerization means and spinneret means for receiving polyamide from said vessel and for melt-spinning the polyamide, the improvement which comprises: single stage reaction means for receiving a stream of the said monomer-containing material directly from said source and polymerizing the same continuously along a single path and for continuously releasing steam along said path under continuously decreasing pressure, said means being a single long narrow tube which is bent into a compact configuration and which substantially surrounds said vessel; first pump means having an outlet in communication with one end of said tube for introducing the monomer-containing stream, said tube having an internal diameter not exceeding 2.5 cm. for the greater part of its length beginning at said one end, the other end of said tube being in communication with said vessel; second pump means for transferring polyamide from said vessel to said spinneret without any appreciable further polymerization, said second pump means having an inlet in communication with said vessel for withdrawing polyamide therefrom; and jacketing means substantially surrounding said tube and said vessel for receiving fluid at polymerization temperatures.

References Cited by the Examiner
UNITED STATES PATENTS

| 1,618,265 | 2/1927 | Bramwell | 23—289 |
| 1,893,492 | 1/1933 | Brill | 23—289 |
| 2,361,717 | 10/1944 | Taylor | 260—78 |
| 2,978,746 | 4/1961 | Rodenacker | 18—8 |
| 3,047,541 | 7/1962 | Ryffel et al. | 18—54 X |
| 3,105,021 | 9/1963 | Randall | 202—160 X |

FOREIGN PATENTS

| 18,172 | 9/1905 | Great Britain. |

MORRIS O. WOLK, *Primary Examiner.*

MICHAEL V. BRINDISI, *Examiner.*

L. S. SQUIRES, J. H. TAYMAN, *Assistant Examiners.*